United States Patent
Bergmann

[15] 3,667,029
[45] May 30, 1972

[54] METHOD AND MEANS FOR CHARGING OR DISCHARGING SUPERCONDUCTING WINDINGS

[72] Inventor: Wilfried H. Bergmann, Leerfeldstr. 10, Munich 45, Germany

[22] Filed: Apr. 15, 1970

[21] Appl. No.: 28,893

[52] U.S. Cl................................323/8, 323/44 F, 323/68, 323/81, 333/99 S, 336/DIG. 1, 338/32 S
[51] Int. Cl.........................................................G05f 3/02
[58] Field of Search ................323/44 F, 68, 8, 81; 317/123; 336/DIG. 1; 338/32 S; 333/99 S; 321/8 CD; 310/10; 307/306

[56] References Cited

UNITED STATES PATENTS

| | | | |
|---|---|---|---|
| 3,278,808 | 10/1966 | Bonfeld | 317/123 |
| 2,946,030 | 7/1960 | Slade | 336/DIG. 1 |
| 3,443,128 | 5/1969 | Fakan | 310/10 |
| 3,611,114 | 10/1971 | Sole | 323/8 |

OTHER PUBLICATIONS

" Voltage Associated With The Coupled Motion of Flux in Type-I Superconductors" by P. R. Solomon; Physical Review Letters Vol. 16 No. 2 (Jan. 10, 1966) (pages 50–52).
" High-Field Superconductor Technology" by C. Laverick; IEEE Spectrum April 1968; pages 63–74.
Institute of Physics Problems, USSR Academy of Sciences July 27, 1965; Author: Yu. V. Sharvin; pg. 183–185.

*Primary Examiner*—Gerald Goldberg
*Attorney*—Roland Anderson

This Patent filed under Rule 47B.

[57] ABSTRACT

A winding of superconducting material is charged by electrically shorting the winding with a hard Type-II series superconducting material and cooling the winding and shorting material to a superconducting temperature. A magnetic flux is generated to penetrate the shorting material to establish therein fluxoids and a temperature gradient is established across the shorting material to cause motion of the fluxoids across the shorting material into the magnetic circuit of the winding to effect charging or discharging thereof.

10 Claims, 1 Drawing Figure

PATENTED MAY 30 1972 3,667,029
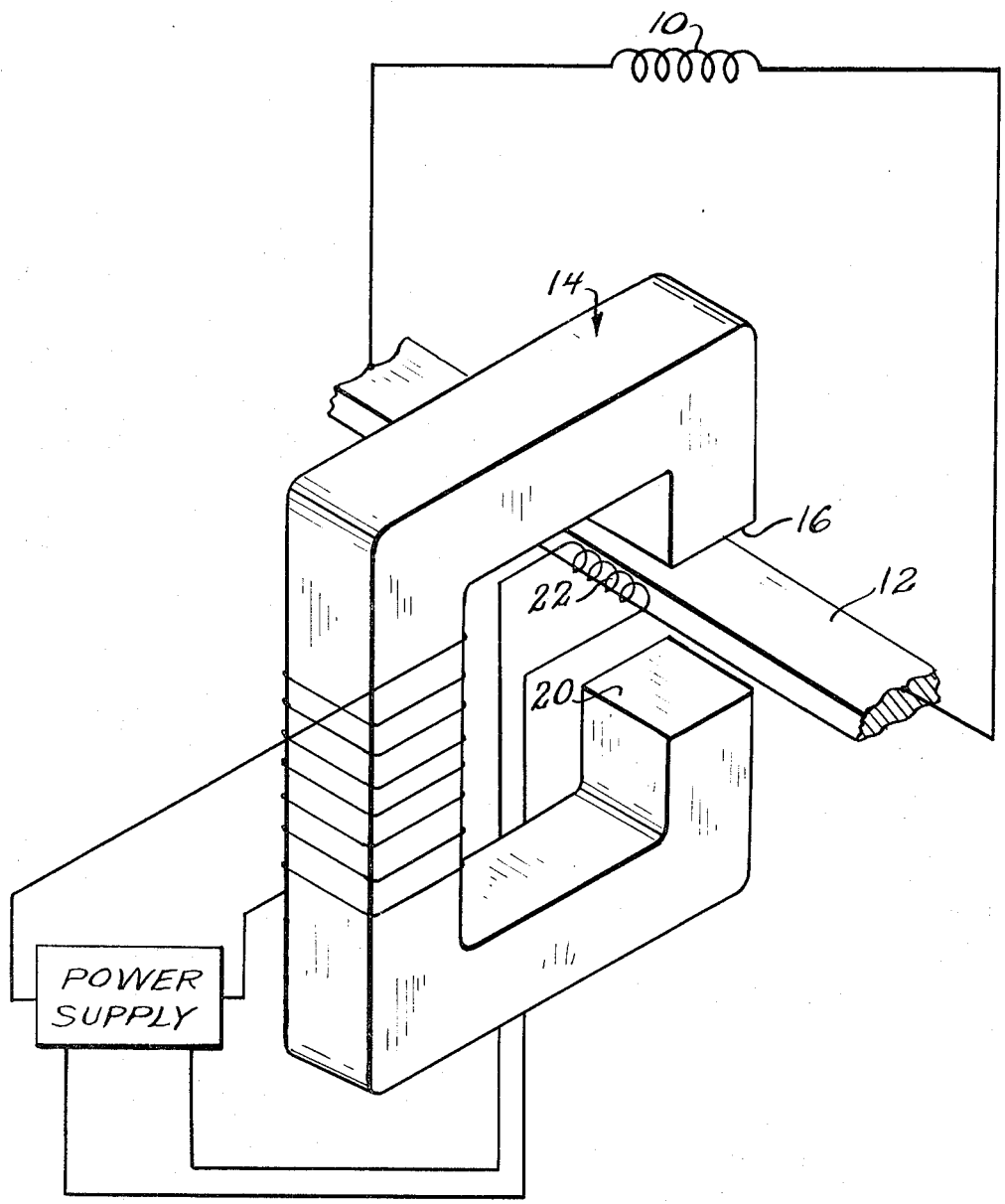
Inventor
Wilfried H. Bergmann
Attorney

METHOD AND MEANS FOR CHARGING OR DISCHARGING SUPERCONDUCTING WINDINGS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to windings of superconducting material and more particularly to a method and means for charging or discharging such windings.

Where large magnetic fields in volume or strength are required, superconducting magnets are generally utilized. The superconducting magnet, in its operation, requires large currents and is generally energized from a conventional d-c generator or battery with current leads running from the d-c generator into the superconductor coolant where they are connected to the superconducting magnet coil or winding. Since the direct current is generated at room temperature, the current leads have to pass from the region at room temperature into the region at the temperature of the superconductor coolant. With this structure and method of operation, the current leads must be large in cross section to carry high currents and the thermal conduction of the current leads cause large losses of the superconductor coolant. Thermally operated superconductive switches are used to permit the magnet to operate in a persistent mode with the input leads being disconnected after magnet charging. However, even with the persistent switch, heat losses still occur with a resultant decrease in the field of the magnet as time elapses. Superconducting magnets are also charged using flux pumps wherein magnetic flux from a source is "threaded into" the magnetic circuit of the superconducting magnet by relative motion between the magnetic flux source and the superconducting magnet. In this structure and method, flux is pumped into the magnetic circuit of the superconducting magnet rather than current. As such, the technique is complex and requires relative motion between the superconducting magnet and the magnetic flux source.

It is therefore an object of the present invention to provide an improved method and means for charging and discharging a winding of superconducting material.

It is another object of the present invention to provide a method and means embodying no moving elements for charging and discharging a superconducting winding.

It is another object of the present invention to provide a more efficient method and means for charging and discharging a superconducting winding.

It is another object of the present invention to provide a method and means operable at superconducting temperatures for charging and discharging a superconducting winding.

Other objects of the present invention will become more apparent as the detailed description proceeds.

SUMMARY OF THE INVENTION

In general, the method and apparatus of the present invention charges a winding of superconducting material and comprises electrically shorting the said winding with a hard Type-II series superconducting material which is cooled to its superconducting temperature. Means are provided for generating a magnetic flux to penetrate said shorting material and to establish a temperature gradient across the shorting material to cause motion of said magnetic flux across said shorting material into the magnetic circuit of said winding to effect charging thereof.

BRIEF DESCRIPTION OF THE DRAWING

Further understanding of the present invention may best be obtained from consideration of the accompanying drawing which discloses, in schematic form, the application of the present invention to a superconducting winding.

PREFERRED EMBODIMENT OF THE INVENTION

Where a superconducting material of the hard Type-II series, that is, a material which comprises superconducting alloys or intermetallic compounds or intersticial compounds, is subject to a magnetic field whose strength is greater than the lower critical field ($H_{C1}$) of the material, the magnetic field will penetrate the superconducting material. Where such penetrations occur, fluxoids are established which cause normal regions to exist within the superconductor whereabout supercurrents (magnetization currents $I_M$) flow. The transport current ($I_T$) flows through the superconducting material around the normal regions formed by the fluxoids. As the external field H or the transport $I_T$ changes, the fluxoids formed in the superconducting material move across the superconducting material in a direction related to the Lorentz force created thereby.

For the practice of the present invention, the winding 10 of a typical superconducting magnet is shorted by a bar 12 of superconducting material of the hard Type-II series. A d-c magnet 14 is mounted so that its complementary pole faces 16 and 20 are on opposite sides of the shorting bar 12. A heating coil 22 is mounted adjacent the shorting bar on one side thereof to establish a unidirectional temperature gradient across the bar in a direction normal to the flux between the pole faces 16 and 20 of the d-c magnet 14.

To charge the winding 10 according to the practice of the present invention, the flux between the pole faces 16 and 20 of the d-c magnet 14 has a value such that it is greater than the lower critical field ($H_{C1}$) of the material of the shorting bar 12. Thus, when the shorting bar 12 together with the winding 10 of the magnet is cooled to a superconducting temperature, the flux between the pole faces 16 and 20 penetrates the shorting bar 12 and establishes therein fluxoids as hereinbefore described. Upon the establishment of fluxoids within the shorting bar 12 by the flux from magnet 14, the heating coil 22 is energized to generate a temperature gradient across the shorting bar normal to the direction of the flux between the pole faces 16 and 20. This temperature gradient causes the fluxoids to travel across the shorting bar into the magnetic circuit of the winding 10 where they act to effect charging of the winding. Threading of the flux from the magnet 14 into the magnetic circuit of the winding 10 continues in this manner until the winding 10 is charged.

The operation of a superconducting material in a superconducting state is a function of the interaction of three variables, namely, the temperature of the superconducting material, the magnetic flux to which the superconducting material is subjected, and the transport current flowing through the superconducting material. The maximum temperature at which the superconducting material may operate is thus a function of the magnetic field to which the superconducting material is subjected and the current flowing through the superconducting material. Thus, in the practice of the present invention, the temperature established by the heating coil 22 at one side of the shorting bar 12 to effect a temperature gradient across the shorting bar cannot exceed the critical temperature of the shorting bar 12, whereby the shorting bar is maintained in its superconducting state. Further, as previously described, the flux from the magnetic coil 14 must be greater than the lower critical field ($H_{C1}$) for the shorting bar 12 and cannot exceed the upper critical field ($H_{C2}$) at which flux the superconducting bar becomes normal. These parameters vary for the particular material used in the superconducting bar 12. Generally, for successful operation of the present invention, the temperature gradient across the shorting bar necessary to effect threading of the flux into the magnetic circuit of the winding 10 is one or two degrees.

It will be appreciated that for a winding in a typical superconducting magnet, the field of the magnet is at a maximum at the edge of the winding closest to the bore of the magnet and at a minimum at the edge of the winding furthest from the bore. When charging the winding of a magnet according to the practice of the present invention, it is preferred to effect threading of the fluxoids into the magnetic field of the winding where the Lorentz effect of the winding is at a minimum, that is, in a low field region of the winding. Thus, in charging of the winding of the magnet according to the practice of the present invention, it is preferred that the shorting bar be positioned so that it is in a minimum field region of the magnet where the Lorentz effect is at a minimum. It will be appreciated that in place of the shorting bar 12, the present invention may also be practiced by closing the winding of the magnet on itself where the winding is of a material of the hard Type-II series. Where such is effected, charging of the magnet is accomplished as hereinbefore described with the heating coil and flux being positioned so that fluxoids are generated in a portion of the winding which is in a minimal field region of the winding, that is, where the Lorentz force is at a minimum value.

For the charging of the magnet in the method hereinbefore described, it is desirable that the pole faces 16 and 20 of the magnet 14 are sized so that they have a minimum length in the direction of the temperature gradient equal to that of the shorting bar 12. It will be appreciated that the heating coil 22 may be built into the winding 10 to form an integral unit therewith.

To discharge the winding 10 according to the practice of the present invention, it is only necessary to reverse the temperature gradient across the shorting bar 12 while maintaining the directional sense of the flux between the pole faces 16 and 20 of magnet 14. This may be easily accomplished by utilizing a dual heating coil construction, each coil being positioned on an opposing side of the shorting bar 12. With the reversal of the temperature gradient, magnet flux from the magnetic circuit of winding 10 will be threaded into the shorting bar 12 as fluxoids which will then travel across the bar in the reverse direction to that followed in charging of the winding 10 whereby discharge of the winding 10 is effected. It will be further appreciated that, instead of reversing the temperature gradient, the sense thereof may be maintained the same as for charging and the sense of the flux between the pole faces 16 and 20 be reversed. This reversing of the flux sense will also cause the fluxoids in the shorting bar 12 to travel out from the magnetic circuit of the winding 10 and effect a discharge thereof. It is to be noted that in effecting discharge of the winding 10 according to the present invention, it is preferred that the pole faces 16 and 20 be sized such that they extend beyond the shorting bar 12 into the magnetic circuit of the winding 10.

It will be appreciated that the practice of the present invention achieves the charging and discharging of the winding of the superconducting magnet by flux pumping without relative motion between a flux source and the magnet winding. Further, the present invention provides a simpler and improved method and apparatus for the charging and discharging of a superconducting winding than heretofore.

The embodiments of the invention in which an exclusive property or privilege is claimed are defined as follows:

1. A method for charging a winding of superconducting material comprising electrically shorting said winding with a hard Type-II series superconducting material, cooling said winding and shorting material to an electrically-superconducting temperature, generating magnetic flux to penetrate said shorting material, and establishing a temperature gradient across said shorting material to cause motion of said magnetic flux across said shorting material into the magnetic circuit of said winding.

2. The method of claim 1 wherein said magnetic flux generation comprises mounting a magnet to dispose the complementary poles thereof on opposing sides of said shorting material, and the flux between said poles has a value greater than the lower critical field value of said shorting material to establish therein fluxoids.

3. The method of claim 1 wherein said shorting of said winding is effected in a low field region of the magnetic circuit of said winding.

4. A method for charging a closed winding of hard Type-II series superconducting material comprising cooling said winding to an electrically-superconducting temperature, generating magnetic fluxoids in a portion of said material, and generating a temperature gradient across said portion of said material to impart motion to said fluxoids into the magnetic circuit of said winding.

5. The method of claim 4 wherein said fluxoids are generated in a portion of said material in a minimum magnetic field region of said winding.

6. The method according to claim 4 wherein generating magnetic fluxoids comprises mounting a magnet to position the complementary poles thereof on opposing sides of said portion of said material, the flux between said poles having a value greater than the lower critical field value of said material to penetrate said portion of material and generate fluxoids therein.

7. The method according to claim 6 further including discharging said winding comprising interchanging the position of said complementary poles of said magnet relative said opposing sides of said portion of said material to reverse the polarity of magnetic flux through said portion of said material while maintaining the sense of said temperature gradient across said portion of said sample.

8. The method according to claim 6 further including discharging said winding comprising positioning the complementary poles of said magnet to overlap said portion of said material and the magnetic circuit of said winding to provide flux flow therefrom through said portion of said material and the magnetic circuit of said winding, and reversing the sense of said temperature gradient across said portion of said material.

9. An apparatus for charging and discharging a winding of superconducting material comprising hard Type-II series superconducting material electrically shorting said winding, means for cooling said winding and said shorting material to superconducting temperature, magnet means including complementary poles mounted on opposing sides of said shorting material to produce therein a magnetic flux, and heating means cooperatively disposed relative said shorting material to effect a temperature gradient thereacross and impart motion to said magnetic flux relative the magnetic circuit of said winding.

10. The apparatus of claim 9 wherein said complementary poles of said magnet means are sized and positioned relative said shorting material to provide a magnetic flux therefrom passing into said shorting material and the magnetic circuit of said winding.

* * * * *